United States Patent
Kullin

(10) Patent No.: US 10,422,383 B2
(45) Date of Patent: Sep. 24, 2019

(54) BEARING CAGE, ROLLING ELEMENT BEARING AND METHOD

(71) Applicant: Aktiebolaget SKF, Gothenburg (DE)

(72) Inventor: Arne Lars Jonas Kullin, Landvetter (SE)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/826,907

(22) Filed: Nov. 30, 2017

(65) Prior Publication Data

US 2018/0163782 A1 Jun. 14, 2018

(30) Foreign Application Priority Data

Dec. 13, 2016 (DE) .................. 10 2016 224 794

(51) Int. Cl.
| | |
|---|---|
| *F16C 33/54* | (2006.01) |
| *B21D 53/12* | (2006.01) |
| *F16C 33/41* | (2006.01) |
| *F16C 33/42* | (2006.01) |
| *F16C 33/49* | (2006.01) |
| *F16C 19/26* | (2006.01) |
| *F16C 19/06* | (2006.01) |
| *F16C 19/10* | (2006.01) |
| *F16C 19/30* | (2006.01) |

(52) U.S. Cl.
CPC ............ *F16C 33/543* (2013.01); *B21D 53/12* (2013.01); *F16C 33/418* (2013.01); *F16C 33/422* (2013.01); *F16C 33/427* (2013.01); *F16C 33/49* (2013.01); *F16C 33/541* (2013.01); *F16C 33/547* (2013.01); *F16C 19/06* (2013.01); *F16C 19/10* (2013.01); *F16C 19/26* (2013.01); *F16C 19/305* (2013.01)

(58) Field of Classification Search
CPC .. F16C 33/3806; F16C 33/422; F16C 33/425; F16C 33/427; F16C 33/54; F16C 33/542; F16C 33/543; B21D 53/12
USPC ...................................... 384/575; 29/898.067
See application file for complete search history.

(56) References Cited

U.S. PATENT DOCUMENTS

| | | | | |
|---|---|---|---|---|
| 1,230,145 A | * | 6/1917 | Folk ....................... | F16C 19/36 384/575 |
| 1,395,385 A | * | 11/1921 | Buckwalter ............ | F16C 33/543 122/7 R |
| 1,513,999 A | * | 11/1924 | Kifer ...................... | F16C 19/36 384/572 |

(Continued)

FOREIGN PATENT DOCUMENTS

DE 102006056502 A1 6/2008

*Primary Examiner* — James Pilkington
(74) *Attorney, Agent, or Firm* — Bryan Peckjian; SKF USA Inc. Patent Dept.

(57) ABSTRACT

A bearing cage for retaining rolling elements of a rolling element bearing. The bearing cage is made of a sheet metal element. The cage provides at least one cage pocket configured to receive at least one rolling element. The at least one cage pocket is formed by two abutting cage bars that extend axially between a first and a second axially displaced ring element. The bearing cage is made of a one-piece sheet metal element and the first and the second ring element is undivided in its circumference without any joints or connections for joining an interrupted ring element. Furthermore, a rolling element bearing and a method of producing the bearing cage is provided.

14 Claims, 6 Drawing Sheets

(56) References Cited

U.S. PATENT DOCUMENTS

| | | | | | |
|---|---|---|---|---|---|
| 3,163,478 | A | * | 12/1964 | Pitner | F16C 33/543 |
| | | | | | 384/623 |
| 3,438,685 | A | * | 4/1969 | Teufel | F16C 33/543 |
| | | | | | 384/575 |
| 7,571,543 | B2 | * | 8/2009 | Kobayashi | B21D 53/12 |
| | | | | | 29/898.064 |

* cited by examiner

BEARING CAGE, ROLLING ELEMENT BEARING AND METHOD

CROSS-REFERENCE TO RELATED APPLICATIONS

This application claims priority to German patent application no. 102016224794.8 filed on Dec. 13, 2016, the contents of which are fully incorporated herein by reference.

BACKGROUND OF THE INVENTION

Technical Field of the Present Invention

According to a first aspect, the present disclosure regards a bearing cage for retaining rolling elements of a rolling element bearing.

According to a second aspect, the present disclosure regards a rolling element bearing comprising a bearing cage according to the first aspect of the present disclosure.

According to a third aspect, the present disclosure regards a method for producing a bearing cage according to the first aspect of the present disclosure.

Description of Related Art

It is well known to make use of cages or retainers in a rolling element bearing for retaining the rolling elements in the bearing. There are different types of cage designs available, as well as different cage materials used, wherein design and material selection depends on various factors, such as type of rolling bearing, application specific demands etc. For instance, cages can be designed for different types of ball bearings or roller bearings, and also materials used can for instance be different kinds of polymers (with or without reinforcing material), iron, steel (such as sheet metal), brass etc.

One example of a cage that has been made from a sheet metal part can be seen in German patent application no. DE102006056502A1. The disclosure presents a cage that is made of a sheet metal and which has been bent into a specific shape such that it attains a form of a cage which is meant to retain rolling elements when the bearing cage is in use in a rolling bearing.

BRIEF SUMMARY OF THE PRESENT INVENTION

At least one object of the present disclosure is to provide a bearing cage for a rolling bearing, which is easy to manufacture, flexible in providing design variations, and which also provides a reliable and stable running when the bearing cage is in use.

The object is achieved by the subject matter as specified in the independent claims. Embodiments of the disclosure can be found in the dependent claims and in the accompanying description.

According to the first aspect of the disclosure, the object is achieved by a bearing cage for retaining rolling elements of a rolling element bearing, wherein the bearing cage is made of a sheet metal element. The cage comprises at least one cage pocket meant to receive at least one rolling element when the bearing cage is in use, wherein the at least one cage pocket is formed by two adjacent cage bars which extend axially between a first and a second axially displaced ring element. In addition, the bearing cage is made of a one-piece sheet metal element and the first and the second ring elements are undivided in their circumference without any joints or connections for joining an interrupted ring element. In an embodiment, at least one of the first and the second ring elements has been folded such that the bearing cage presents an L- or U-shape seen in an axial cross section of the cage and further such that there is a circumferentially extending fold present between the at least one ring element and the adjacent cage bars.

It has namely been realized by the inventor that it may be economically favorable and feasible to provide a bearing cage which is made of sheet metal and which has been folded into its specific cage form without beforehand dividing or splitting any one of the ring elements. In known designs one has cut at least one of the ring elements such that it provides an interrupted ring shape and then subsequently bent the sheet metal element into a cage form. Thereafter the previously made cuts have been joined together again by e.g. a welding operation to thereby form cage pockets. With the present disclosure, the inventor has realized that it is possible and also more efficient to make a cage by folding one sheet metal element without providing any cuts on any of the ring elements for dividing the ring elements.

Furthermore, by folding the material in a specific pattern a functional cage can be formed. This enables the use of thin sheets as raw material that is not bearing size specific. Thus, no size specific press tools are required. Therefore, the cage design is also advantageous for smaller production series and thus opens up for a more flexible manufacturing operation.

An interrupted ring element means that the ring element has been divided such that there are non-material portions present between adjacent ring segments of the ring element. One could also define an interrupted ring element as a discontinuous ring element, or a broken ring element. The opposite to an interrupted ring element is an un-interrupted ring element, a continuous ring element or an unbroken ring element.

In an embodiment, the bearing cage is a one-piece and un-interrupted sheet metal element.

In an embodiment, the bearing cage is a one-piece and un-interrupted sheet metal element without any joints or connections for joining any of the first and the second ring element to any one of the two adjacent cage bars of the at least one cage pocket.

Axial and radial direction is frequently used as reference in this document. If not stated otherwise, an axial direction of the bearing cage or the rolling element bearing is referring to an axial imaginary line extending in an axial direction of a shaft/axle onto which the rolling bearing is meant to be mounted when in use (in other words the rotational axle of the rolling element bearing and the bearing cage). A radial direction of the bearing cage or the rolling element bearing is referring to a direction which is perpendicular to the axial direction.

In an embodiment, at least one of the cage bars presents a first portion, whereby the first portion has been made by folding a part of the sheet metal element such that the first portion extends in a radial direction of the cage and such that an axially extending fold is present on the cage bar.

It has been realized by the inventor that it may be economically favorable to provide a bearing cage which is made of sheet metal, but also that it would be further advantageous for the cage's running performance and rolling bearing reliability to fold at least one of the sides in a cage pocket such that the rolling element in the cage pocket will contact a smooth surface of the sheet metal element, and not an edge portion of the sheet metal element. In previous designs, the sides of the cage pockets that are meant to contact and guide the rolling raceway surface of the rolling element when the cage is in use have been edge surfaces of the sheet metal element that e.g. have been cut. Such surfaces may present sharp edges and corners which would not be favorable for the bearing's performance. In addition, or alternatively, such edge surfaces may need to undergo some kind of treatment to make the edge and corners smoother, such as for instance by providing a chamfering operation. This would thus lead to another subsequent manufacturing operation. With the new proposed design such manufacturing operation is no longer necessary.

Furthermore, by providing a folded portion in the cage pocket, thinner sheet metal elements can be used. In previous designs, sheet thickness is determined by the required cage and rolling element contact width. Due to the folded portion this is no longer relevant, and therefore a thinner sheet metal element can be used, which will lead to lower weight, which is good for performance, but also to a reduced material cost.

In an embodiment, the first portion presents at least one surface which is arranged to contact a rolling raceway surface of a rolling element in the cage pocket when the bearing cage is in use.

Due to that the contact portion between the cage and the rolling element is emanating from a smooth side surface of the sheet metal element, it enables improved tribology compared to cut surfaces in known cage designs.

In an embodiment, the sheet metal element presents an upper and a lower side surface and an edge surface therebetween, and wherein the at least one surface of the first portion is a surface emanating from one of the upper or lower side surface.

In an embodiment, the other one of the two adjacent cage bars of the at least one cage pocket presents a corresponding second portion adjacent to the first portion, whereby the second portion has been made by folding a part of the sheet metal element such that the second portion extends in a radial direction of the cage and such that an axially extending fold is present on the cage bar. It shall be noted that any specific embodiment specified in this disclosure of the first portion is also applicable for the second portion and vice versa.

In embodiments of the present disclosure, any one of the first and second portion may present an additional fold on its surface facing the rolling element when the bearing cage is in use. For example, if the rolling element presents a curved outer profile (such as a barrel shaped roller element) the surface of the portion may be designed to essentially match the outer profile of the rolling element. In an embodiment, any one of the first or second portion presents a contacting surface which is designed to contact the rolling element by a one-point contact when in use. In another embodiment, any one of the first and second portion presents a contacting surface which is designed to contact the rolling element by a two-point contact when in use. The contacting surface may also be designed with more than a two-point contact. In the case when there is a one-point contact, the cage portion will mainly function as a separator for the rolling elements in the bearing cage. In the case the contacting surface is designed with a two-point contact or more, the cage may also function as a guiding element for the rolling element.

In an embodiment, the first ring element presents at least one third portion, whereby the at least one third portion has been made by folding a part of the sheet metal element such that the third portion extends in an axial direction of the cage and such that a circumferentially extending fold is present on the first ring element. In a further embodiment, the at least one third portion presents a surface on a radially inner side of the third portion, which surface is meant to contact a rolling bearing ring of the rolling element bearing when the bearing cage is in use. Thus, the third portion may be designed as a guiding surface of the bearing cage. The surface may be guiding against an inner or an outer ring of a rolling bearing, i.e. the cage may be inner or outer ring guided when in use.

In an embodiment, the second ring element presents an undulating wave-like profile in the circumferential direction of the bearing cage. Such a shape may improve the cage strength and thereby lead to a more robust and rigid cage design. In an embodiment, at least one wave-form of the undulating wave-like profile presents a joint between two adjacent sides of the wave-form. Such a joint may e.g. be made by a welding operation, such as spot welding. This may even further improve cage robustness and rigidity.

The words fold and folding, which are used in this document could also be replaced by e.g. the words bend and bending. A fold can be seen as a separator of an extended surface such that it presents two surfaces on each respective side of the fold, which two surfaces are relatively angled. In other words, a fold can be represented by a line or area (straight or curved) which separates two surfaces and wherein the two surfaces are relatively angled. The fold may be represented by an essentially sharp edge following a line, but it may also be a more smooth transition (such as a curved profile with a specific radius) between the two surfaces.

In an embodiment of the present disclosure, the bearing cage presents at least one slit in any position of the bearing cage. Slits may for example be made to facilitate the folding operation of the bearing cage. In one embodiment, there are slits provided at the ends of any of the first, second or third portion before the portions are folded. In a further embodiment, there are slits present on any of the first, second or third portion. In a further embodiment, there is at least one slit on any one of the first or second ring element. It shall be noted that a slit does not herein mean that the ring element has been divided or broken in its circumference.

According to the second aspect of the present disclosure, the object is achieved by a rolling bearing element, which comprises at least on bearing cage according to any of the embodiments of the first aspect of the disclosure. It shall here be noted that any embodiment of the second aspect of the disclosure is combinable with any embodiment of the first aspect of the disclosure and vice versa. The rolling element bearing may be any kind of rolling bearing, such as a ball bearing or a roller bearing. The roller bearing may e.g. be provided with cylindrical rollers, tapered rollers or barrel shaped rollers. Examples of bearings presenting barrel shaped rollers are spherical roller bearings, toroidal roller bearings and angular contact toroidal roller bearings, also known as SAT bearings. In an embodiment, when the rolling bearing comprises barrel shaped rollers, the first and/or second portion of the bearing cage is angled such that it at least partly follows the shape of the barrel shaped roller. In an embodiment of the bearing cage, at least one of the first and second portion is divided into at least two separate surfaces with an interruption (such as a slit) in-between the surfaces. In a further embodiment, the separated surfaces are angled relative each other such that they at least partly follow a curved profile of a barrel shaped roller. Advantages of the second aspect of the disclosure are analogous to the ones already presented in relation to the first aspect of the disclosure and vice versa.

According to the third aspect of the present disclosure, the object is achieved by a method for producing a bearing cage according to any of the embodiments of the first aspect of the disclosure. The method comprises the following steps:

1) provide a disk-shaped sheet metal element, wherein the disk-shaped sheet metal element presents a central bore and at least one opening arranged radially outwardly from the central bore, the opening presents two adjacent side surfaces which extend in a radial direction of the disk-shaped element, 2) fold the disk-shaped element such that the disk-shaped element attains a form of a bearing cage presenting an L-shaped or a U-shaped profile seen in an axial cross section of the bearing cage, which bearing cage presents a first and a second ring element which are axially displaced from each other, and wherein the disk-shaped element attains the bearing cage form without dividing any of the first or second ring element.

Advantages of the method are analogous to the advantages already disclosed hereinabove in relation to the first and the second aspect of the disclosure. It has namely been realized by the inventor that it is advantageous to make a bearing cage from a sheet metal element, preferably a one-piece element, and subsequently fold the element into a cage form without dividing any of the ring elements of the bearing cage.

In an embodiment, the disk-shaped element attains the bearing cage form without dividing any of the first or second ring element and without dividing any of the ring elements with any one of the cage bars. In other words, the bearing cage has been folded into its specific shape without introducing any cuts, interruptions and the like of the ring elements and between the ring elements and any one of the cage bars. Hence, the bearing cage is made of one continuous and one-piece sheet metal element.

In an embodiment, the method comprises the additional step:

3) fold a first portion of the disk-shaped element, which first portion comprises one of the radially extending side surfaces of the at least one opening, such that the first portion extends out from the disk-shaped element and such that the first portion extends in a radial direction of the bearing cage.

In an embodiment, the method comprises the additional step:

4) fold a second portion of the disk-shaped element, which second portion comprises the other one of the radially extending side surfaces of the at least one opening, such that the second portion extends out from the disk-shaped element and such that the second portion extends in a radial direction of the bearing cage.

In an embodiment, the method comprises the additional step:

5) fold at least one third portion out from the disk-shaped element, which at least one third portion is located on a radially inner or outer side of the disk-shaped element and on any of the first or second ring element.

In an embodiment of the third aspect of the present disclosure, the method comprises the additional step:

6) fold on one axial side of the ring form such that the side attains an undulating wave-like profile in the circumferential direction of the ring form.

BRIEF DESCRIPTION OF THE DRAWINGS

Exemplifying and preferred embodiments of the present disclosure will now be described more in detail, with reference to the accompanying drawings, wherein.

Figure 1:
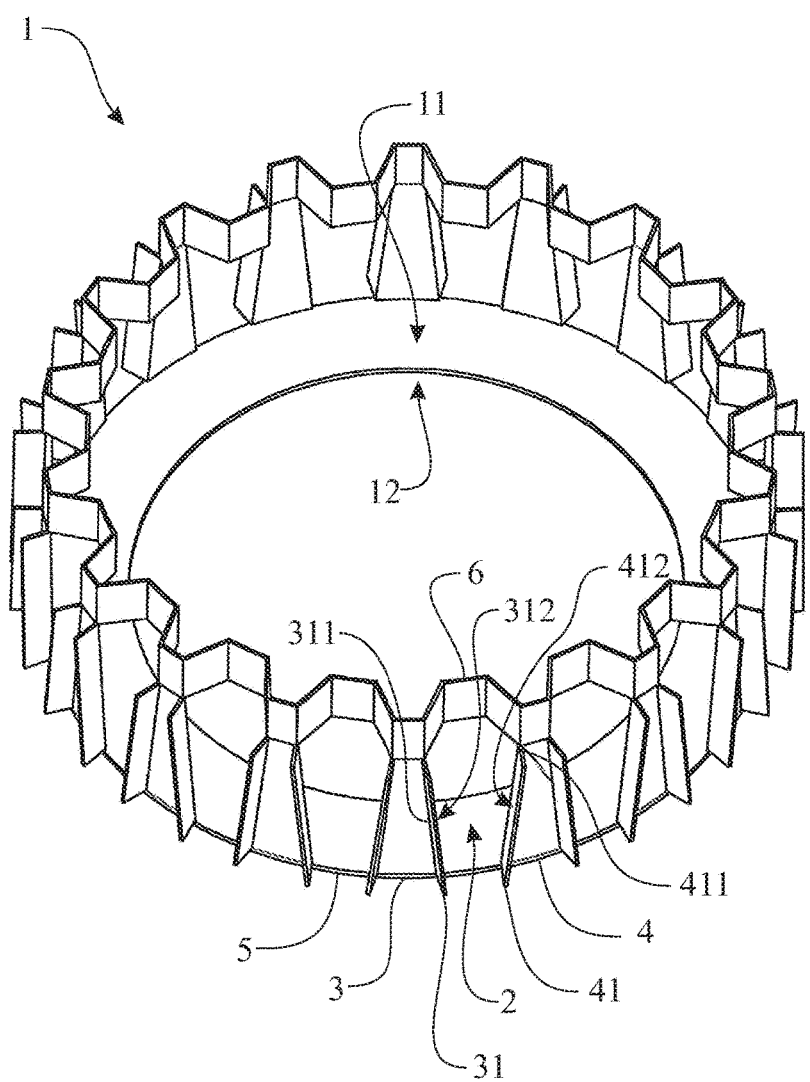
FIG. 1 presents a bearing cage according to an embodiment of the disclosure.

The drawings show diagrammatic exemplifying embodiments of the present disclosure and are thus not necessarily drawn to scale. It shall be understood that the embodiments shown and described are exemplifying and that the disclosure is not limited to these embodiments. It shall also be noted that some details in the drawings may be exaggerated in order to better describe and illustrate the disclosure.

DETAILED DESCRIPTION OF THE PRESENT INVENTION

FIG. 1 illustrates a bearing cage 1 according to an embodiment of the present disclosure. The bearing cage 1 is designed for retaining rolling elements of a rolling element bearing (not shown in this figure), wherein the bearing cage 1 is made of a sheet metal element. The bearing cage 1 comprises at least one cage pocket 2 meant to receive at least one rolling element when the bearing cage 1 is in use, wherein the at least one cage pocket 2 is formed by two adjacent cage bars 3 and 4 which extend axially between a first and a second axially displaced ring element 5 and 6. In addition, the bearing cage 1 is made of a one-piece sheet metal element and the first and the second ring elements 5 and 6 are undivided in their circumference without any joints or connections for joining an interrupted ring element. In addition, in this specific embodiment, one of the cage bars 3 presents a first portion 31, whereby the first portion 31 has been made by folding a part of the sheet metal element such that the first portion 31 extends in a radial direction of the cage 1 and such that an axially extending fold 311 is present on the cage bar. Furthermore, the radially extending first portion 31 presents at least one surface 312 which is arranged to contact a rolling raceway surface of a rolling element in the cage pocket 2 when the bearing cage 1 is in use.

The other one 4 of the two adjacent cage bars of the at least one cage pocket 2 presents a corresponding second portion 41 adjacent to the first portion 31, whereby the second portion 41 has been made by folding a part of the sheet metal element such that the second portion 41 extends in a radial direction of the cage 1 and such that an axially extending fold 411 is present on the cage bar 4. In this embodiment, the first portion 31 and the second portion 41 extend in the same radial direction. In addition, in this embodiment, the first portion 31 and the second portion 41 extend radially outwardly. The first and the second portion 31 and 41 may in other embodiments extend radially inwardly or even one portion may extend radially inwardly and the other one radially outwardly. The radially extending second portion 41 presents at least one surface 412 which is arranged to contact a rolling raceway surface of a rolling element in the cage pocket 2 when the bearing cage 1 is in use.

The second ring element 6 presents an undulating wave-like profile in the circumferential direction of the bearing cage 1. Such a shape may improve the cage strength and thereby lead to a more robust and rigid cage design. In an embodiment, at least one wave-form of the undulating wave-like profile presents a joint between two adjacent sides of the wave-form (not shown in this figure). Such a joint may e.g. be made by a welding operation, such as spot welding. This may even further improve cage robustness and rigidity.

Figure 2:
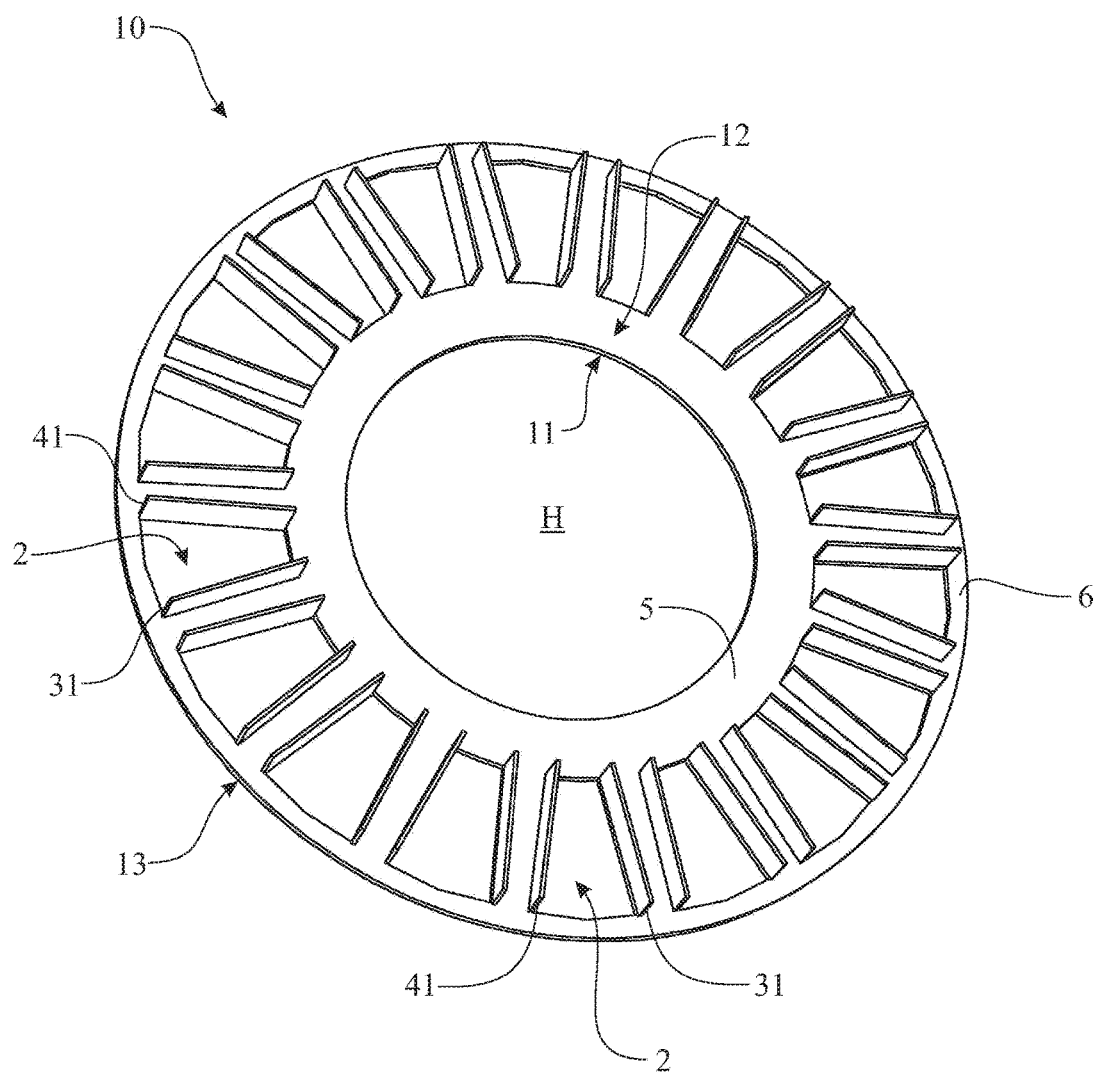
FIG. 2 presents a disk-shaped element made from a sheet metal element according to an embodiment of the present disclosure.

Now turning to FIG. 2, a disk-shaped element 10 can be seen. The disk-shaped element 10 is supposed to be folded into a shape that represents a bearing cage 1, as seen for instance in FIG. 1. The disk-shaped element 10 has an upper surface 11, a lower surface 12, and an edge surface 13. As can be seen, the disk-shaped element 10 presents a central bore H and a plurality of cage pockets 2 located radially outwardly from the bore H. In addition, it can be seen that the cage pockets 2 presents a first and a second portion 31 and 41 which has been folded such that the portions 31 and 41 extend outward from the disk-shaped element 10. The folding operation of the portions 31 and 41 can be made at any time, such as when the element is still in the form of a disk or later when the ring attains a cage form. The inner edge of the disk-shaped 10 element that defines the bore H will eventually become the first ring element 5 as seen in e.g. FIG. 1, and consequently the outer side of the disk-shaped element will become the other ring element 6, wherein no one of the ring elements 5 and 6 are divided before and after folding the disk into a bearing cage form. The disk-shaped element may be folded without introducing any cuts to separate and divide any one of the ring elements 5 and 6 and the cage bars 3 and 4.

Figure 3:
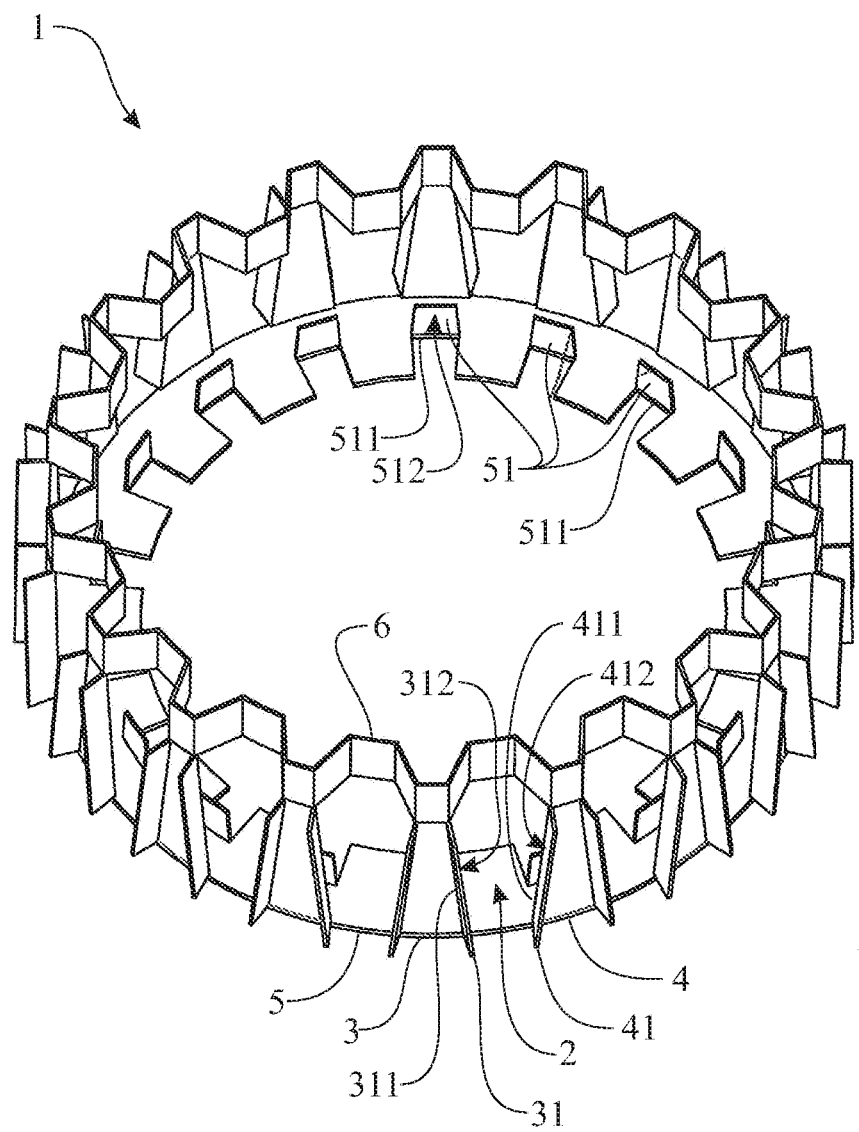
FIG. 3 presents a bearing cage according to an embodiment of the disclosure.

FIG. 3 shows an embodiment of a bearing cage 1 according to the present disclosure. The bearing cage 1 is designed for retaining rolling elements of a rolling element bearing (not shown in this figure), wherein the bearing cage 1 is made of a sheet metal element. The bearing cage 1 comprises at least one cage pocket 2 meant to receive at least one rolling element when the bearing cage 1 is in use, wherein the at least one cage pocket 2 is formed by two adjacent cage bars 3 and 4 which extend axially between a first and a second axially displaced ring element 5 and 6. In addition, one of the cage bars 3 presents a first portion 31, whereby the first portion 31 has been made by folding a part of the sheet metal element such that the first portion 31 extends in a radial direction of the cage 1 and such that an axially extending fold 311 is present on the cage bar. Furthermore, the radially extending first portion 31 presents at least one surface 312 which is arranged to contact a rolling raceway surface of a rolling element in the cage pocket 2 when the bearing cage 1 is in use.

The other one 4 of the two adjacent cage bars of the at least one cage pocket 2 presents a corresponding second portion 41 adjacent to the first portion 31, whereby the second portion 41 has been made by folding a part of the sheet metal element such that the second portion 41 extends in a radial direction of the cage 1 and such that an axially extending fold 411 is present on the cage bar 4. In this embodiment, the first portion 31 and the second portion 41 extend in the same radial direction. In addition, in this embodiment, the first portion 31 and the second portion 41 extend radially outwardly. The radially extending second portion 41 presents at least one surface 412 which is arranged to contact a rolling raceway surface of a rolling element in the cage pocket 2 when the bearing cage 1 is in use.

The second ring element 6 presents an undulating wave-like profile in the circumferential direction of the bearing cage 1. The first and the second ring elements 5 and 6 are also in this embodiment undivided in its circumference without any joins or connections for joining an interrupted ring element.

Furthermore, the embodiment in FIG. 3 presents a third portion 51 on the first ring element 5. The at least one third portion 51 has been made by folding a part of the sheet metal element such that the third portion 51 extends in an axial direction of the cage 1 and such that a circumferentially extending fold 511 is present on the first ring element 5. Further, in this embodiment, the at least one third portion 51 presents a surface 512 on a radially inner side of the third portion 51, which surface 512 is meant to contact a rolling bearing ring of the rolling element bearing when the bearing cage 1 is in use. Thus, the third portion 51 may be designed as a guiding surface of the bearing cage 1. The surface may be guiding against an inner or an outer ring of a rolling bearing, i.e. the cage may be inner or outer ring guided when in use, but also the cage may be guided by the rolling elements without any contact with any of the inner or outer ring.

Figure 4A:
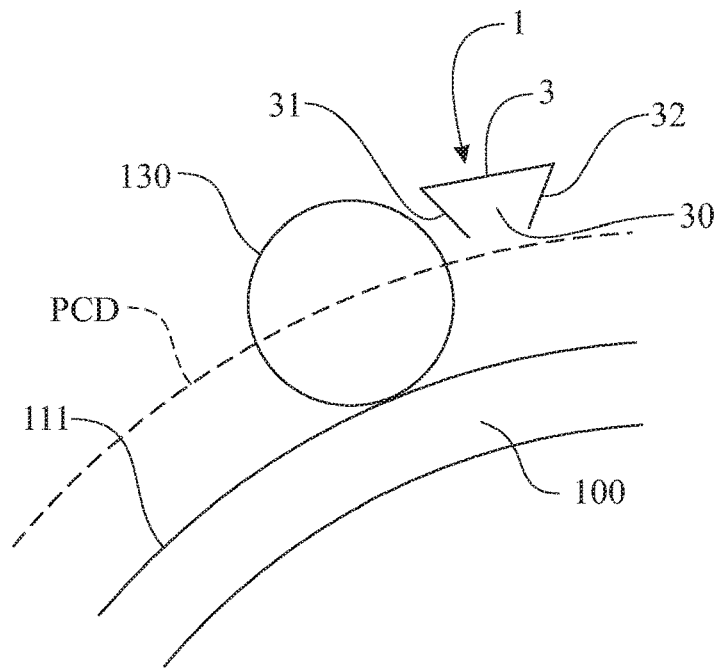
FIGS. 4A and 4B present two bearing cages according to two embodiments of the disclosure.
Figure 4B:
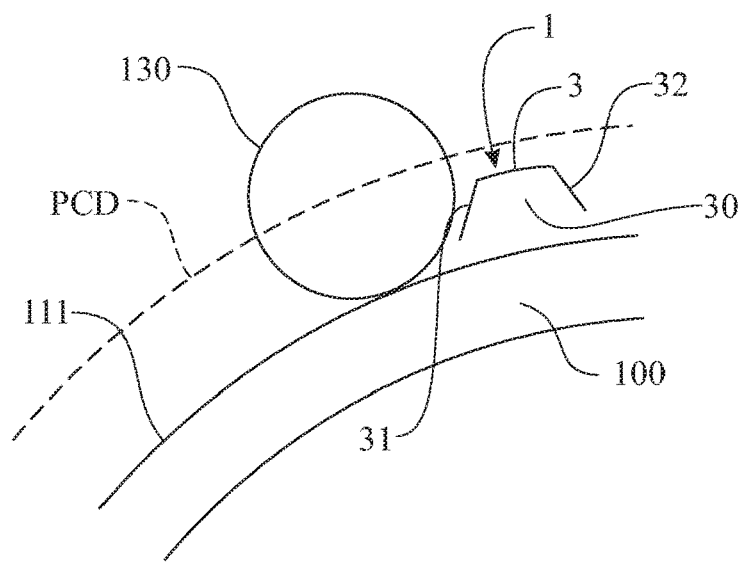

FIGS. 4A and 4B present embodiments of the present disclosure wherein a part of a bearing cage 1 and a rolling element 130 on a rolling raceway surface 111 of a rolling element bearing 100 can be seen. The view is illustrating a part of a rolling element bearing 100 seen from an axial side of the bearing. In FIG. 4A a bearing cage 1 can be seen that presents a first portion 31 of a cage bar 3 and another portion 32 on the same cage bar 3. The portions 31 and 32 extend radially inwardly towards a center of the rolling element bearing 100. The rolling element center defines a pitch circle diameter PCD of the rolling element bearing 100. In this embodiment, the cage is designed such that the contact between the cage 1 and the rolling element 130 will be radially above the PCD.

Now turning to FIG. 4B, a bearing cage 1 can be seen that presents a first portion 31 of a cage bar 3 and another portion 32 on the same cage bar 3. The portions 31 and 32 extend radially inwardly towards a center of the rolling element bearing 100. The rolling element center defines a pitch circle diameter PCD of the rolling element bearing 100. In this embodiment, the cage is designed such that the contact between the cage 1 and the rolling element 130 will be radially below the PCD. In both embodiments seen in FIGS. 4A and 4B, a space 30 is created between the portions 31 and 32. The space 30 may e.g. be used as a reservoir for lubricant when the rolling element bearing is used. This may improve the lubrication in the bearing and hence it may lead to an increased service life of the bearing 100.

Figure 5:
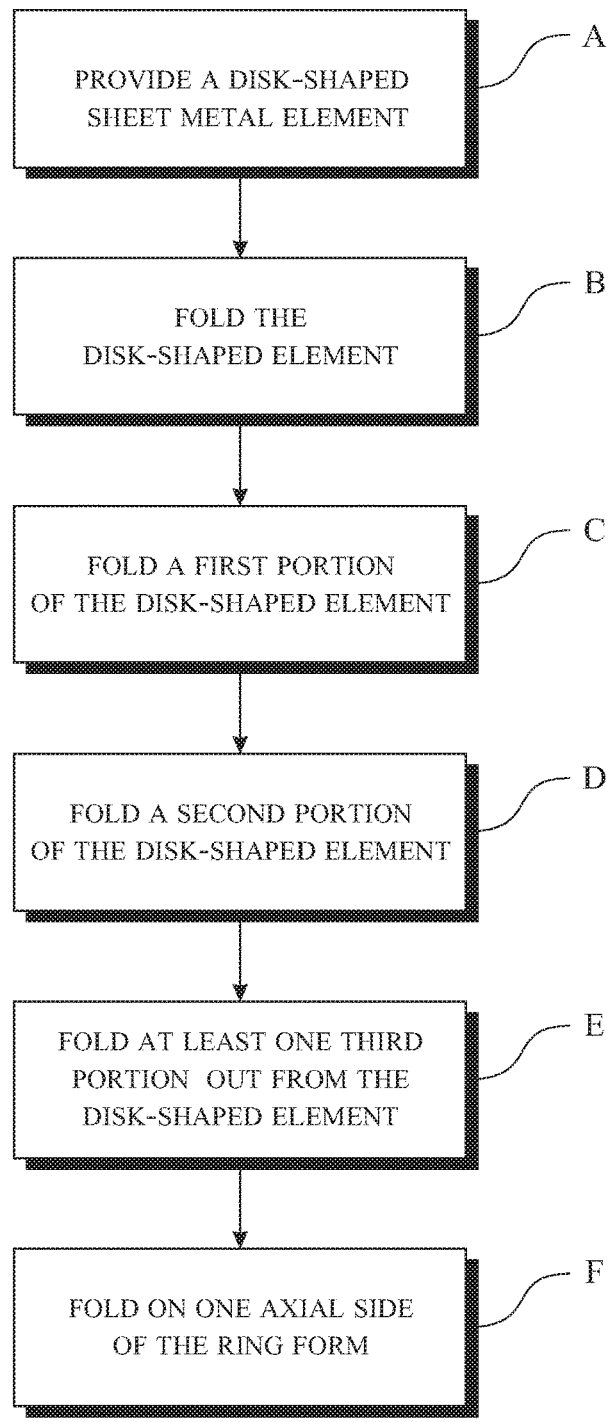
FIG. 5 presents an embodiment of a method according to the third aspect of the disclosure.

FIG. 5 shows a block diagram of an embodiment of the method according to the third aspect of the disclosure. The method comprises the following steps:

A) provide a disk-shaped sheet metal element 10, wherein the disk-shaped sheet metal element 10 presents a central bore H and at least one opening 2 arranged radially outwardly from the central bore H, the opening presents two adjacent side surfaces which extend in a radial direction of the disk-shaped element 10, and B) fold the disk-shaped element 10 such that the disk-shaped element 10 attains a form of a bearing cage 1 presenting an L-shaped or a U-shaped profile seen in an axial cross section of the bearing cage 1, which bearing cage 1 presents a first and a second ring element 5 and 6 which are axially displaced from each other, and wherein the disk-shaped element 10 attains the bearing cage form without dividing any of the first or second ring element 5 and 6.

It shall in relation to any of the embodiments presented regarding this method be noted that the method is not necessarily limited to the order in which the steps are presented herein. The skilled person will recognize that the method also can be performed in other sequences without departing from the general concept of this method. For example, the folding of the portions 31 and 41 can be made after or before the disk-shaped element 10 has been folded into a ring form.

Furthermore, the method may comprise the additional step:

C) fold a first portion 31 of the disk-shaped element 10 (or ring form), which first portion 31 comprises one of the radially extending side surfaces of the at least one opening 2, such that the first portion 31 extends out from the disk-shaped element 10.

Furthermore, the method may comprise the additional step:

D) fold a second portion 41 of the disk-shaped element 10 (or ring form), which second portion 41 comprises the other one of the radially extending side surfaces of the at least one opening 2, such that the second portion extends out from the disk-shaped element.

Furthermore, the method may comprise the additional step:

E) fold at least one third portion 51 out from the disk-shaped element 10 (or ring form), which at least one third portion 51 is located on a radially inner or outer side of the disk-shaped element 10 (or on the first ring element 5 of the bearing cage).

Furthermore, the method may comprise the additional step:

F) fold on one axial side of the ring form such that the side attains an undulating wave-like profile in the circumferential direction of the ring form.

In an embodiment, before folding any of the portions, slits may be provided at the ends of the portions to thereby facilitate the folding operation.

Figure 6:
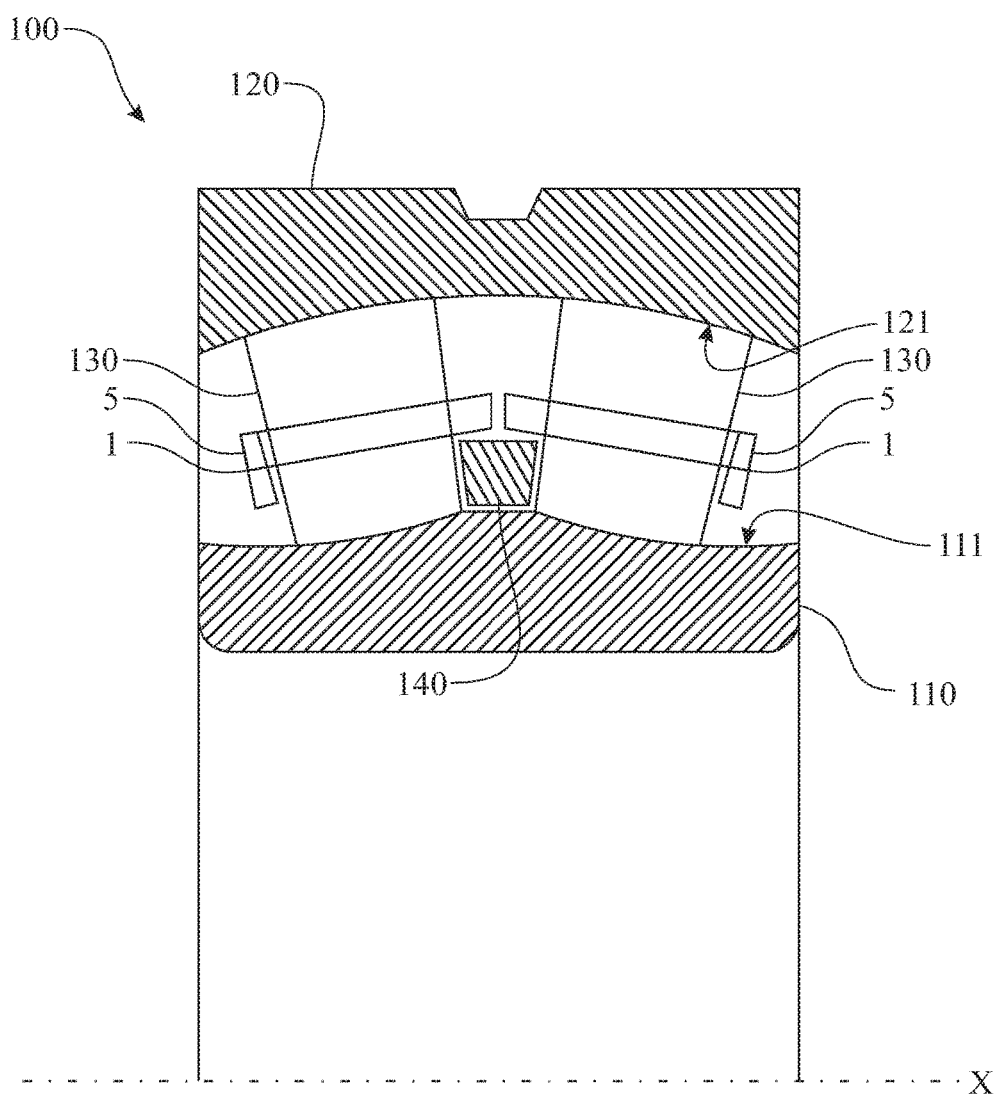
FIG. 6 presents a rolling element bearing according to an embodiment of the second aspect of the disclosure.

Now turning to FIG. 6, a cross section of a rolling element bearing 100 according to an embodiment of the disclosure can be seen. The cross section shows a plane wherein the axial center line X of the rolling element bearing 100 is in the plane. The rolling bearing 100 in this embodiment is a spherical roller bearing presenting two rows with rolling elements 130. As already stated hereinabove, the present bearing cage is not limited to any kind of bearing, but can also be used for other types of rolling bearings. The rolling bearing presents an inner ring 110 that comprises an inner raceway surface 111 and an outer ring 120 that comprises an outer raceway surface 121. The rolling elements are retained and guided by two bearing cages 1 and 1 according to an embodiment of the present disclosure. In addition, in this embodiment, the rolling rows of the rolling elements 130 are separated by a guide ring 140. The bearing 100 may also be equipped with an intermediate flange or even without a flange or a guide ring. Furthermore, the bearing 100 may also be equipped with sealing rings on each respective axial side of the bearing 100. The seals may be fixed to at least one of the bearing rings 110 and 120, but also the seal may in an embodiment be connected to at least one of the bearing cages 1. In an embodiment, the ring element 5 located on the axial outer side of the bearing 100 may be designed such that it provides a sealing function of the bearing 100. The ring element 5 may also be coated on any of its radially outer and inner side, for instance with a rubber or similar, which may be used for sealing the bearing 100. The sealing means on the ring element 5 may be arranged to contact any of the inner or outer ring 110 and 120 when the bearing is in use.

Furthermore, the rolling elements 130 may be mounted into the cage and the rolling bearing and thereafter a last folding of the cage 1 may take place. In the last folding step one of the rings 5 or 6 may be folded such that it points in a radial direction to finally "lock in" and retain the rolling elements 130 in the bearing cage 1. This may for example be advantageous for bearings that presents a specific contact angle, such as a SAT bearing, a tapered roller bearing (TRB) or the like. It can also be advantageous for other bearing types, such as cylindrical roller bearings (CRB).

The disclosure is not limited to the embodiments described herein. It would be evident for the skilled person that other embodiments and modifications to the embodiments specified hereinabove are also possible within the scope of the claims.

REFERENCE CHARACTER LIST

| Ref. Designator | Description |
| --- | --- |
| 1: | Bearing cage |
| 2: | Cage pocket |
| 3: | Cage bar |
| 30: | Lubrication reservoir |
| 31: | First portion |
| 311: | Fold for first portion |
| 312: | Contacting surface of first portion |
| 32: | Another portion on the same cage bar |
| 4: | Cage bar |
| 41: | Second portion |
| 411: | Fold for second portion |
| 412: | Contacting surface of second portion |
| 5: | First ring element |
| 51: | Third portion |
| 511: | Fold for third portion |
| 512: | Contacting surface of third portion |
| 6: | Second ring element |
| 10: | disk-shaped element |
| 11: | upper side surface |
| 12: | lower side surface |
| 13: | edge surface |
| 100: | Rolling element bearing |
| 110: | Inner ring |
| 111: | Inner raceway surface |
| 120: | Outer ring |
| 121: | Outer raceway surface |
| 130: | Rolling element |
| 140: | Guide ring |
| A: | Step to provide a disk-shaped sheet metal element |
| B: | Step to fold the disk-shaped element |
| C: | Step to fold a first portion of the disk-shaped element |
| D: | Step to fold a second portion of the disk-shaped element |
| E: | Step to fold at least one third portion out from the disk-shaped element |
| F: | Step to fold on one axial side of the ring form |
| X: | Rotational axis |
| H: | Bore |
| PCD: | Pitch Circle Diameter |

What is claimed is:

1. A bearing cage for retaining rolling elements of a rolling element bearing, the bearing cage made from a sheet metal element, and comprises, at least one cage pocket configured to receive at least one rolling element, the at least one cage pocket formed by two adjacent cage bars that extend axially between a first axially displaced ring element and a second axially displaced ring element, and an undulating wave-like profile in the circumferential direction of the bearing cage provided in the second ring element, wherein the bearing cage is made of a one-piece sheet metal element and the first ring element and the second ring element are undivided along their circumference without any joints or connections for joining an interrupted ring element.

2. The bearing cage according to claim 1, wherein the bearing cage is a one-piece and un-interrupted sheet metal element.

3. The bearing cage according to claim 1, wherein the bearing cage is a one-piece and un-interrupted sheet metal element without any joints or connections for joining any of the first ring element and the second ring element to any one of the two adjacent cage bars of the at least one cage pocket.

4. The bearing cage according to claim 1, wherein at least one of the cage bars provides a first portion, the first portion made by folding a part of the sheet metal element such that the first portion extends in a radial direction of the cage and such that an axially extending fold is present on the cage bar.

5. The bearing cage according to claim 4, wherein the first portion provides at least one surface that is arranged to contact a rolling raceway surface of a rolling element in the cage pocket.

6. The bearing cage according to claim 5, wherein the sheet metal element presents an upper side surface and a lower side surface and an edge surface therebetween, and wherein the at least one surface of the first portion is a surface emanating from one of the upper side surface or lower side surface.

7. The bearing cage according to claim 4, wherein the other one of the two adjacent cage bars of the at least one cage pocket provides a corresponding second portion abutting the first portion, the second portion made by folding a part of the sheet metal element such that the second portion extends in a radial direction of the cage and such that an axially extending fold is provided on the cage bar.

8. The bearing cage according to claim 7, wherein the first ring element provides at least one third portion, the at least one third portion has been made by folding a part of the sheet metal element such that the third portion extends in an axial direction of the cage and such that a circumferentially extending fold is provided on the first ring element.

9. The bearing cage according to claim 8, wherein the at least one third portion presents a surface on a radially inner side of the third portion, which surface is meant to contact a rolling bearing ring of the rolling element bearing.

10. A rolling bearing element comprising:
at least one bearing cage according to claim 1.

11. A method for producing a bearing cage made from a disk-shaped sheet metal element having a central bore therethrough,
the method comprising:
obtaining the disk-shaped sheet metal element;
forming at least one opening arranged radially outwardly from the central bore, the opening presents two abutting side surfaces which extend in a radial direction of the disk-shaped element;
shaping the disk-shaped element such that the disk-shaped element attains a form of a bearing cage providing an L-shaped or a U-shaped profile seen in an axial cross section of the bearing cage, the bearing cage provides a first second ring element and a second ring element that are axially displaced from each other; and
forming an undulating wave-like profile in the circumferential direction of the bearing cage provided in the second ring element,
wherein the disk-shaped element attains the bearing cage form without dividing any of the first ring element or second ring element.

12. The method for producing a bearing cage according to claim 11, the method comprising the additional step:
folding a first portion of the disk-shaped element, the first portion comprises one of the radially extending side surfaces of the at least one opening, such that the first portion extends out from the disk-shaped element and such that the first portion extends in a radial direction of the bearing cage.

13. The method for producing a bearing cage according to claim 12, the method comprising the additional step:
folding a second portion of the disk-shaped element, the second portion comprises the other one of the radially extending side surfaces of the at least one opening, such that the second portion extends out from the disk-shaped element and such that the second portion extends in a radial direction of the bearing cage.

14. A bearing cage for retaining rolling elements of a rolling element bearing, the bearing cage made from a sheet metal element, and comprises,
at least one cage pocket configured to receive at least one rolling element, the at least one cage pocket formed by two adjacent cage bars that extend axially between a first axially displaced ring element and a second axially displaced ring element,
wherein the bearing cage is made of a one-piece sheet metal element and the first ring element and the second ring element are undivided along their circumference without any joints or connections for joining an interrupted ring element,
wherein at least one of the cage bars provides a first portion, the first portion made by folding a part of the sheet metal element such that the first portion extends in a radial direction of the cage and such that an axially extending fold is present on the cage bar,
wherein the other one of the two adjacent cage bars of the at least one cage pocket provides a corresponding second portion abutting the first portion, the second portion made by folding a part of the sheet metal element such that the second portion extends in a radial direction of the cage and such that an axially extending fold is provided on the cage bar,
wherein the first ring element provides at least one third portion, the at least one third portion has been made by folding a part of the sheet metal element such that the third portion extends in an axial direction of the cage and such that a circumferentially extending fold is provided on the first ring element,
wherein the at least one third portion presents a surface on a radially inner side of the third portion, which surface is meant to contact a rolling bearing ring of the rolling element bearing.

* * * * *